United States Patent [19]

Marans et al.

[11] Patent Number: 4,614,762

[45] Date of Patent: Sep. 30, 1986

[54] WATER SOLUBLE LINEAR POLYETHYLENEIMINE DERIVATIVE FROM WATER-INSOLUBLE POLYETHYLENEIMINE, POLYVINYL ALCOHOL AND ALDEHYDE

[75] Inventors: Nelson S. Marans, Silver Spring; Stephen M. Pulford, Baltimore, both of Md.

[73] Assignee: W. R. Grace & Co., New York, N.Y.

[21] Appl. No.: 620,977

[22] Filed: Jun. 15, 1984

[51] Int. Cl.[4] ............................................. C08F 8/00
[52] U.S. Cl. ........................................ 525/61; 525/56; 525/414; 525/417; 525/540
[58] Field of Search ................... 525/61, 56, 414, 417, 525/540

[56] References Cited

U.S. PATENT DOCUMENTS 3,348,997  10/1967  Lagally et al. ................. 525/61
3,597,313   8/1971  Williams et al. ................ 525/61

OTHER PUBLICATIONS

Encyclopedia of Polymer Science and Engineering, vol. I, (1985), pp. 687 to 696.

*Primary Examiner*—Harold D. Anderson
*Attorney, Agent, or Firm*—Howard J. Troffkin

[57] ABSTRACT

The present invention is directed to a high molecular weight, water soluble polymer product of polyethyleneimine, said product is formed by reacting a linear polyethylenimine with formaldehyde and a polyvinyl alcohol. The resultant product is useful as an improved drainage and retention aid in papermaking processes.

5 Claims, No Drawings

WATER SOLUBLE LINEAR POLYETHYLENEIMINE DERIVATIVE FROM WATER-INSOLUBLE POLYETHYLENEIMINE, POLYVINYL ALCOHOL AND ALDEHYDE

BACKGROUND OF INVENTION

In modern papermaking, an ever-increasing emphasis is being placed on providing means which will increase productivity and minimize the content of solids in the wash water. These goals are normally provided by wet-end additives. Some of the benefits the papermaker realizes by increasing the drainage rate and the retention of particulate matter in the web being formed include better economic utilization of the furnish material, improved quality of the resultant sheet product, cleaner white-water effluent and, therefore, minimization of its treatment before release, and permitting of increase in rate and production by increased rate of drainage.

A large variety of materials have been used to provide increased drainage rate and as retention aids. The most widely used of these are salts of aluminum, in particular aluminum sulfate, sodium aluminate and sodium phosphoaluminate. These materials, however, have the defect of being required to be used in large amounts and do not exhibit high efficiency.

Various polymeric materials, from naturally occurring gums to synthetic resins, have been developed for use in papermaking. Included among the later catagory are polymers based on polyethyleneimine.

Polyethyleneimine is conventionally formed by ring opening of the monomeric compound, ethyleneimine. The resultant product is a water-soluble, high molecular weight, highly branched polymer having normally about 25 percent primary amine and 25 percent tertiary amine groups. The resultant polyethyleneimine, due to its water solubility and high amino nitrogen content, exhibits excellent properties with respect to drainage and retention when used in paper making processes. However, because the starting monomer, ethyleneimine, is a known carcinogen, the production and use of the resultant polymer has been drastically limited.

Other routes have been studied to form polyethyleneimine. One established route is by the use of an N-substituted oxazolines, such as the N-methyl derivative to produce a polymer having a linear configuration. When the polyacetylethylenimine intermediate is partially hydrolyzed, it yields a water-soluble, linear polymer having ethyleneimine units therein. These polymers, however, exhibit poor retention and drainage properties. When the polymer intermediate is more fully hydrolyzed the resultant linear polyethyleneimine is substantially insoluble in water and, therefore, cannot be used as a wet-end additive.

It is highly desired to be able to form a retention and drainage aid material based on a polyethyleneimine polymer which has a maximum amount of secondary amino groups therein, which is formed from non-carcinogenic material and which is capable of being added to and solvating in the aqueous slurry of the head-box of a paper forming process.

SUMMARY OF THE INVENTION

The present invention is directed to forming a linear polyethyleneimine derivative which is water soluble and suitable for head-box application as a drainage and retention aid in conventional paper forming processes. Polymerization of 2-methyl-2-oxazoline followed by substantially complete hydrolysis and neutralization provides a linear polyethyleneimine which is reacted with formaldehyde and polyvinyl alcohol to give a water soluble polyvinyl alcohol grafted polyethyleneimine product having the desired properties.

DETAILED DESCRIPTION OF THE INVENTION

The present invention is directed to a water-soluble linear polyethyleneimine derivative and to the use of said derivative as a drainage and retention aid in paper making processes.

It is known that 2-oxazolines having the structural formula

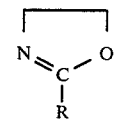

wherein R represents a hydrogen atom or methyl group (preferably methyl) can be formed into a homopolymer by ring opening in the presence of a cationic polymerization catalyst at temperatures of from about 0°–200° C. The catalysts include organic sulfonic acids and their esters, acidic salts such as ammonium sulfate, $AlCl_3$, $SnCl_4$, $BF_3$ and the like. The polymer thereby obtained is a linear N-formyl or N-acetyl polyethyleneimine. The resultant polymer normally has a weight average molecular weight of from about 5,000 to 200,000 depending on the particular catalyst used, its concentration and the conditions of the polymerization as well known to those skilled in this art. The 2-methyl-2-oxazoline can be obtained commercially and can be readily prepared by the reaction of acetonitrile and ethanolamine using zinc acetate as a catalyst. The 2-oxazoline can be prepared by the reaction of 2-chloroethylformamide with base according to the procedure described by Wenker in J.A.C.S., 60 2152 (1938) as well as other known methods.

It has unexpectedly been found that linear polyethyleneimines which are substantially free of acyl groups can be readily formed by the substantially complete hydrolysis of the N-formyl and N-acetyl polyethyleneimine. Other N-acyl polyethyleneimine precursors are not capable of undergoing complete hydrolysis. Hydrolyzed polymers of these higher acyl group polymers normally contain a high residual acyl content and are distinctly (water solubility; NH content; etc.) from the substantially completely hydrolyzed linear polyethyleneimine used in the present invention.

The polymerization of 2-oxazoline or 2-methyl-2-oxazoline is preferably carried out using a Lewis acid catalyst as described above, preferably $AlCl_3$, $SnCl_4$ or $BF_3$ in an organic solvent such as a halogenated hydrocarbon as, for example, monochlorobenzene, which can be readily removed upon completion of the polymerization.

The resultant N-formyl or N-acetyl polyethyleneimine can be substantially completely hydrolyzed by conventional techniques using either acid or base hydrolysis. Acid hydrolysis using a strong mineral acid such as hydrochloric or sulfuric acid is preferred. The hydrolysis is normally carried out under elevated temperatures of 50° to 100° C. by refluxing an aqueous acidic solution containing the polymer for short periods of time of from 1 to 10 hours, preferably from 2–6 hours to obtain the completely hydrolyzed polymer product.

The linear polyethyleneimine (PEI) formed by acid hydrolysis is in the form of the salt. The free polyamine can be obtained by the addition of a base such as sodium hydroxide. Purification of the precipitated free PEI can be readily done by standard techniques such as extraction (using a lower alcohol such as methanol) and removal of the solvent. The resultant polymer is a linear, substantially water insoluble polyethyleneimine having substantially (at least 90 and preferably 95 percent) free amino groups therein and can be viewed as having the linear structure of repeating units ($-CH_2CH_2NH-$). The term linear polyethyleneimine or PEI as used herein and in the appended claims refers to this product.

Linear polyethyleneimine formed in the manner described above is substantially insoluble in water, is a moderate molecular weight material having a very high weight ratio of secondary to primary amino groups per unit weight of polymer, is substantially free of primary and tertiary amino groups and is free (at least about 90 percent, preferably at least 95 percent removed) of acyl groups. The polymer has a weight average molecular weight of from about 2,500 to 100,000.

The polyvinyl alcohol (PVA) used to form the desired polyethyleneimine derivative product can be any polyvinyl alcohol which is at least about 75 mole percent and preferably greater than 90 mole percent hydrolyzed material. The polyvinyl alcohol can have a weight average molecular weight of from about 1,500 to 150,000 or even higher. Preferred materials are those having a low molecular weight of from about 1,500 to 50,000 and most preferably from about 1,5000 to 25,000. These polyvinyl alcohols can be commercially obtained or formed in known manners.

The linear polyethyleneimine and the polyvinyl alcohol are chemically bonded with the aid of $C_1$–$C_2$ aldehyde, preferably formaldehyde, to provide a linear polyethenimine derivative product having good water solubility and performance as a drainage and retention aid. The resultant polymer can be conceptualized as having a linear polyethyleneimine backbone with polyvinyl alcohol chains pendent from some of the nitrogen atoms via an alkylene bridge. This conceptualization of the resultant polymer is not meant to be a limitation thereon but merely as a way of viewing and further understanding the product. The amounts of PEI, PVA and aldehyde used to form the desired polymer can vary greatly and will be dependent upon the molecular weight of the PEI and the PVA. Normally, the higher the molecular weight of the PEI the larger the amount of PVA of a specific molecular weight is required per unit weight of PEI. Wide variations are acceptable to provide desired material. For example, molar ratios of PEI to PVA to aldehyde can range from 1:0.1:0.1 to 1:10:10 and preferably from 1:0.2:0.2 to 1:3:3.

The reaction of PEI, PVA and formaldehyde can be carried out in a liquid carrier, such as an aqueous medium. The PEI initially forms a suspension in the water. The PEI and PVA are normally introduced into the liquid carrier and then the aldehyde is added in small increments over a period of time. The reaction can be carried out at temperatures of from 25° C. to reflux and normally is complete after four hours although longer or shorter times may be sufficient to complete the reaction.

The resultant polymer is useful as a wet-end additive in conventional papermaking processes to provide an increased rate of drainage and retention of particulate, in particular, fines, during the web formation.

The following examples are given for illustrative purposes only and are not meant to be a limitation on the invention as defined in the appended claims. All parts and percentages are by weight unless otherwise indicated.

EXAMPLE I

POLYMERIZATION AND HYDROLYSIS 100 parts of commercially obtained 2-methyl-2-oxazoline were introduced to 550 parts of chlorobenzene. 1.6 parts of $BF_3$ etherate were then introduced. The solution was refluxed for 8 hours. Fine particles formed were dispersed in the chlorobenzene. The material was dried in a vacuum oven at 70° C. and 150 Torr for 24 hours to give 107 parts of yellow powder polyacetylethylenimine.

57 parts of the formed polyacetylethylenimine and 98 parts of 6N HCl were heated to reflux for 6 hours and then treated with 65 parts of NaOH in 400 ml of water (pH=11). The material was then filtered, washed with distilled water and dried. The dried material was extracted with methanol thereby separating any sodium chloride, sodium hydroxide and/or sodium acetate from the polymer. The methanol solution was dried yielding 21.7 parts (80 percent) linear polyethyleneimine. Analysis of the polymer showed it to be over 95 percent hydrolyzed, have water solubility of only 0.06 part/100 part water at 25° C. and have a melting point of 60°–62° C.

LINEAR POLYETHYLENEIMINE/POLYVINYL ALCOHOL PRODUCT

Linear polyethyleneimine formed above and various polyvinyl alcohols (commercially obtained) were dispersed in amounts stated below in 100 parts of water. The water was heated to 50° C. and maintained at that temperature while incremental amounts of 37% solution of formaldehyde were added. The resultant solution was mixed for 4 hours and then vacuum dried. The material in each instance was a solid dark yellow to brown material. The resultant polymer was added to 100 parts water to observe solubility. A summary of several samples is given in Table I below.

TABLE I

| SAMPLE | PARTS PEI | PARTS $H_2CO$ | PARTS PVA | MW of PVA | pH | PARTS PRODUCT | SOLUBILITY AT ROOM TEMP. |
|---|---|---|---|---|---|---|---|
| 1. | 2 | 1 | 4 | 2,000 | 9 | 6.7 | soluble |
| 2. | 2 | 2 | 4 | 2,000 | 9 | 6.4 | soluble |
| 3. | 4 | 1 | 2 | 2,000 | 10 | 6.5 | soluble |
| 4. | 4 | 2 | 2 | 2,000 | 10 | 6.9 | soluble |
| 5. | 2 | 1 | 4 | 14,000 | 9 | 6.6 | soluble init. warmed to dissolve small residue. |
| 6. | 2 | 2 | 4 | 14,000 | 9 | 6.1 | soluble init. warmed to dissolve small residue. |
| 7. | 4 | 2 | 2 | 14,000 | 10 | 6 | soluble init. warmed to dissolve small residue. |
| 8. | 2 | 1 | 4 | 124,000 | 9 | 6.3 | soluble; init. dissolved in warm $H_2O$ |

TABLE I-continued

| SAMPLE | PARTS PEI | PARTS H₂CO | PARTS PVA | MW of PVA | pH | PARTS PRODUCT | SOLUBILITY AT ROOM TEMP. |
|---|---|---|---|---|---|---|---|
| 9. | 4 | 1 | 2 | 124,000 | 10 | — | soluble; init. dissolved in warm H₂O |
| 10. | 4 | 2 | 2 | 124,000 | 10 | 6.2 | soluble; init. dissolved in warm H₂O |
| 11. | 3 | 1 | 3 | 124,000 | 9 | 6.4 | soluble; init. dissolved in warm H₂O |

DRAINAGE/RETENTION ACID

Each of the products formed in the manner described above is used to treat a soft wood pulp suspension by standard techniques of using a Britt Jar. Each product shows good drainage and retention properties.

We claim:

1. A water soluble polymer product formed by reacting the reactants consisting essentially of a linear, substantial water insoluble polyethyleneimine having at least about 90 percent of the amino groups therein in the form of free secondary amino groups, a polyvinyl alcohol and a $C_1$–$C_2$ aldehyde to form a single polymer product of said three reactants, said molar ratio of linear polyethyleneimine to polyvinyl alcohol to aldehyde being reacted is from about 1:0.1:0.1 to 1:10:10.

2. The product of claim 1 wherein the polyvinyl alcohol is at least 75 mole percent hydrolyzed polymer having a weight average molecular weight of from 1,500 to 150,000 and the aldehyde is formaldehyde.

3. The product of claim 1 wherein the linear polyethyleneimine has a weight average molecular weight of from about 2,500 to 100,000, the polyvinyl alcohol is at least 90 percent hydrolyzed having a weight average molecular weight of from 1,500 to 50,000 and the aldehyde is formaldehyde.

4. The product of claim 1 wherein the molar ratio of linear polyethyleneimine to polyvinyl alcohol to aldehyde is from 1:0.2:0.2 to 1:3:3.

5. The product of claim 3 wherein the molar ratio of linear polyethyleneimine to polyvinyl alcohol to aldehyde is from 1:0.2:0.2 to 1:3:3.

* * * * *